2,808,380

AQUEOUS COMPOSITIONS CONTAINING POLYVINYL ALCOHOL AND SUBSTITUTED STARCH, THE SUBSTITUENT BEING A SALT OF A CARBOXYL RADICAL

Herbert C. Olsen, Merrick, N. Y., and Richard A. Weidener, West Englewood, N. J., assignors to National Starch Products Inc., New York, N. Y., a corporation of Delaware No Drawing. Application February 27, 1953, Serial No. 339,488

3 Claims. (Cl. 260—17.4)

It has been known to employ polyvinyl alcohol as an additive to aqueous dispersions of starch, for various purposes. Thus, polyvinyl alcohol is added to cooked starch pastes for use in textile warp sizing, adding characteristics of strength to the sized fiber. Polyvinyl alcohol is also used as a component of starch-base adhesives, not only because of its inherent adhesive and binding properties, but also because it often imparts qualities of water-resistance to the ultimate adhesive bond.

In industrial practice, adhesive and sizing compositions are often prepared in final form by the manufacturers of these compounds, and are packed, stored and shipped in drums, barrels or other containers to the industrial user. In other cases, and particularly in textile mill practice, the starch is cooked in water, with the other desired components, at the place where it is to be used, as for example in the textile mill. However, there is always the probability that the starch dispersion will have to stand for substantial periods of time, and this raises a particularly serious problem where polyvinyl alcohol is one of the components of the starch formulation.

Polyvinyl alcohol in many cases is not permanently compatible with ordinary aqueous starch dispersions. When included as an ingredient of starch dispersions and allowed to stand without agitation, the polyvinyl alcohol soon rises to the top and separates out from the rest of the composition. This separation of polyvinyl alcohol is observed most frequently in compositions of medium or low viscosity. When one remembers that starch compounds for adhesive, sizing and other industrial purposes are frequently complex and delicately balanced mixtures of starches, lubricants, plasticizers, peptizers, solvents, preservatives and other chemical ingredients, it is seen that the separation of any one component destroys the balance and homogeneity of the entire formula. The composition may of course be agitated so as to mix the polyvinyl alcohol back in with the other components, but such mixing "in situ" is not only tedious and time-consuming but is not always wholly effective.

It is therefore of great value to devise a means for increasing the stability of polyvinyl alcohol-starch compositions.

We have now discovered that remarkable improvements in the stability of polyvinyl alcohol-starch compositions are achieved when one employs as the major starch component a starch ether or ester derivative containing within its substituent groups the salts of acid radicals such as, for example, carboxyl radicals. The salts may be formed by reacting the carboxyl radical with ammonium or mono-valent metallic ions, such for example as sodium or potassium. Such starch derivatives may be produced in various ways. One such method is described in U. S. Patent No. 2,461,139, where starch is treated, in the presence of sodium hydroxide or equivalent base, with anhydrides of organic cyclic di-basic acids, such for example as maleic, succinic, phthalic, glutaric and citraconic anhydrides. By this method there may be introduced into the starch molecule groups containing the sodium or equivalent salt of the carboxyl radical. By a method taught in application of Caldwell Ser. No. 756,106, filed June 20, 1947 (abandoned), a maleic anhydride-starch ester salt of the type described in the above-mentioned patent is treated with a bisulfite, thereby introducing a certain number of sulfonic acid groups into the substituent portion of the molecule containing the carboxyl groups. An entirely different type of starch derivative is taught in application of Caldwell et al. Ser. No. 168,386, filed June 15, 1950 (abandoned), wherein starch is treated with monochloracetic acid or equivalent hydrophilic etherifying agent, in the presence of alkali and enough water to moisten the starch but not to permit gelatinization, resulting in an ungelatinized, cold water soluble starch ether containing carboxyl groups in the substituent portion (the carboxyl group again being in the form of the sodium or equivalent salt).

The particular starch type will be chosen in the light of the particular conditions to be met and the specific use to which the composition is to be put. Sometimes a cold water soluble type will be desirable, at other times not; similarly in using starch derivatives one may choose those made from corn, potato, tapioca, wheat, sago, waxy maize or any of the other starch types. The only requirement for the purposes of our invention is that the starch product be one which has been chemically substituted so as to incorporate a salt of a carboxyl group such as COONa, with or without other acid groups, within the substituent radical, and that it be dispersible in water, either cold or upon cooking.

Derivatives of the above-described type, when dispersed in water, and mixed with polyvinyl alcohol, with such other ingredients as may be desired, are characterized by remarkable stability against separation of the polyvinyl alcohol. Such compositions have remained completely stable and homogeneous for months, whereas corresponding compositions made with untreated starch have shown separation of the polyvinyl alcohol in a matter of hours or days.

The proportion of polyvinyl alcohol to be incorporated with the starch dispersion will depend entirely upon the use to which the composition is to be put as well as the type of polyvinyl alcohol employed. It is known that polyvinyl alcohol is the hydrolysis product of polyvinyl acetate, and is obtainable in the relatively pure form or in forms containing various residual amounts of the vinyl ester. It is also available in various viscosity types, the ultimate use determining the type to be chosen. As will be seen in the following examples, quantities of polyvinyl alcohol as high as 100%, based on the starch derivatives, have remained stable for months, without separating out of the composition, whereas the same proportions of polyvinyl alcohol mixed with the corresponding untreated starch separated out in a few hours. On the other hand similarly excellent stability was obtained using relatively small amounts of polyvinyl alcohol, such as 5%. It should be emphasized that these proportions are given merely by way of example and not as a limitation. There is nothing to preclude the successful use of proportions of polyvinyl alcohol greater than 100% based on the starch derivative, according to our invention.

We have found that the stability against separation of polyvinyl alcohol achieved by our invention is most notable in (but is not limited to) starch-derivative-polyvinyl alcohol aqueous dispersions within the pH range of about pH 3 to about pH 10. As one approaches extreme acidity the starch derivative is characterized by a preponderance of free carboxyl groups, rather than the salt of these groups, and this in turn leads in the direction of water insolubility and separation. On the other hand, extreme alkalinity will tend to degrade the starch derivative, particularly in the case of starch esters, breaking off the entire substituent group and thus destroying the structure within the starch derivative that is essential for the practice of our invention.

The following examples will further illustrate the embodiment of our invention.

Example I

This example illustrates the preparation of an adhesive composition, using a starch ether prepared according to the method of said application Ser. No. 168,386, filed June 15, 1950. In this case as well as in subsequent examples, all parts given are by weight. In a jacketed blender, 100 parts of tapioca starch of normal moisture content were swept with nitrogen and sprayed with 24.6 parts of a 40% aqueous sodium hydroxide solution, maintaining the temperature at a maximum of 23° C. After about five minutes there were added by spraying 16 parts of a 75% aqueous solution of monochloracetic acid, keeping the temperature at a maximum of 34° C. Continuous agitation was maintained throughout the reaction. During the next four hours the temperature was permitted to rise spontaneously, and a maximum of 48° C. was attained. Nitrogen was circulated continuously during this period, at such a rate as to reduce the moisture content by the end of the period to about 18.5%, as determined by heating a sample in a constant temperature oven at 130° C. for 4 hours, the mixer cover having an opening which permitted moisture evaporation. The reaction was then allowed to continue for approximately one hour at 60–65° C., an additional hour at 70–75° C., and finally for about 2½ hours at 80–85° C., after which the mass was cooled to room temperature. The resulting product was a starch ether containing the carboxyl groups in the form of a sodium salt. This product may be represented by the diagrammatic formula:

Starch—O—CH₂COONa 100 parts of the granular, free-flowing starch ether made as above were dispersed in 800 parts water at room temperature. There were added, with agitation, 100 parts of polyvinyl alcohol of a type approximately 86–89% hydrolized and having a viscosity of 20–25 centipoises when measured as a 4% water solution at 20° C. by means of the Hoeppler falling ball method. The mixture was allowed to stand in a container for more than one month, without agitation of any kind. At the end of that period there was no perceptible separation of the polyvinyl alcohol, and the mixture was completely homogeneous, and ready for use for various adhesive applications.

A comparable mixture was made by using the same ingredients as above, except that an ordinary pregelatinized tapioca starch, chemically unmodified, was used in place of the starch ether. After standing only one day a separation of the polyvinyl alcohol became apparent, and this separation became more noticeable as time went on.

Example IA

This example illustrates the preparation of an adhesive composition, using a waxy maize starch ether, prepared according to the method of said said application Ser. No. 168,386, filed June 15, 1950.

28.7 parts of a 76% aqueous sodium hydroxide solution were sprayed into 100 parts of waxy maize starch, maintaining continuous agitation. The sodium hydroxide, at that high solution concentration, is ordinarily solid at room temperatures and it was therefore kept in a molten, sprayable condition by heating. 62 parts of powdered sodium monochloracetate were dusted into the starch blend. Agitation was maintained for four hours during which a maximum temperature of about 35° C. was attained. The reaction mixture was then allowed to stand in a closed container at room temperature for about four weeks. The final product was a starch ether containing the carboxyl groups in the form of the sodium salt (Starch—O—CH₂COONa).

100 parts of the starch ether made as above were dispersed in 800 parts of water at room temperature and there were added with agitation 100 parts of polyvinyl alcohol of the same type used in Example I.

After standing for several weeks there was no perceptible separation of the polyvinyl alcohol.

Example II

This example illustrates the preparation of a warp sizing formulation, using a starch ester prepared according to the method of said application Ser. No. 756,106, filed June 20, 1947.

One hundred parts of the ammonium salt of the corn starch ester of maleic acid $$\text{(Starch—O—C—CH=CHCOONH}_4\text{)}$$
$$\phantom{\text{(Starch—O—}}\|\phantom{\text{CH=CHCOONH}_4\text{)}}$$
$$\phantom{\text{(Starch—O—}}\text{O}$$

containing approximately 1 maleic acid ester radical per 28 anhydroglucose units was suspended in 200 parts of water in which was dissolved 7 parts of sodium bisulfite. The mixture was stirred for 4 hours at room temperature. The starch product was then filtered and washed.

One hundred parts of the above starch ester containing the salt of carboxyl and sulfonic acid groups were cooked for ½ hour in 800 parts water with 5 parts polyvinyl alcohol of 45–55 centipoises viscosity (measured as previously described) and approximately 99% hydrolysis, and 2 parts of a paraffin wax type lubricant. The resultant mixture proved to be an excellent sizing composition. The mixture was allowed to stand without agitation, and even after the lapse of a month no separation of polyvinyl alcohol was noted. The same example was repeated, using 35 parts of the polyvinyl alcohol, and here, too, no separation of polyvinyl alcohol was discernible upon storage. On the other hand, formulations of equivalent viscosity made with untreated cornstarch showed separation of polyvinyl alcohol within a matter of hours or days at the most.

Example III

This example illustrates the preparation of a warp sizing composition, using a starch ester of the type described in U. S. Patent No. 2,461,139. Thus 100 parts of corn starch, acid-converted to a degree known in the trade as 60 fluidity, were suspended in 150 parts water and succinic anhydride was added in successive portions of about ½ part each, alternately with additions of sufficient 3% aqueous potassium hydroxide solution to maintain the pH between 7 and 8. Alternate addition of alkali and anhydride was continued with constant agitation, until 4 parts of succinic anhydride had been added. The potassium salt of the starch ester thus produced was then filtered and washed with water. This starch ester may be represented diagrammatically as:

$$\text{Starch—O—C—CH}_2\text{CH}_2\text{COOK}$$
$$\phantom{\text{Starch—O—}}\|$$
$$\phantom{\text{Starch—O—}}\text{O}$$

One hundred parts of the starch ester produced as above described was cooked for ½ hour in 900 parts of water, with 20 parts polyvinyl alcohol of 23–28 centipoises viscosity and approximately 99% hydrolysis. The sizing composition thus produced remained stable against separation of the polyvinyl alcohol for at least several weeks, as contrasted to a composition of equivalent viscosity made with the corresponding untreated starch, which showed separation of the polyvinyl alcohol almost immediately.

Example IIIA

This example illustrates the preparation of a warp sizing composition using a starch ester of the type described in said U. S. Patent No. 2,461,139.

100 parts of corn starch were suspended in 125 parts of water and there was added, with stirring, enough 3% potassium hydroxide solution to raise the pH of the mixture to 11. There was then added enough phthalic anhydride to lower the pH to 7. Alternate addition of 3% potassium hydroxide solution and phthalic anhydride was continued until 5 parts of phthalic anhydride altogether had been added. The pH was adjusted to neutral and the starch was filtered, washed and dried. The corn starch ester thus produced may be represented as

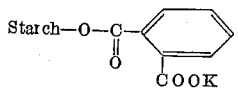

100 parts of the above starch ester were cooked with water and polyvinyl alcohol in the same manner, and using the same quantities as in Example III, with similar remarkable stability being apparent.

*Example IV*

This example illustrates the preparation of an adhesive composition.

Five parts of the starch ester described in Example II were suspended in 60 parts water, and, there were added 2.5 parts of polyvinyl alcohol of 45–55 centipoises viscosity and approximately 99% hydrolysis. The mixture was cooked to 200° F. for ½ hour. The cooled mixture proved to have excellent adhesive qualities. After standing for two weeks, no separation of polyvinyl alcohol was noted. On the other hand, the same composition of equivalent viscosity and made with the corresponding ordinary untreated starch base showed a definite separation of polyvinyl alcohol.

In the examples given, there is introduced into the starch molecule groups containing the sodium, potassium or ammonium salt of a carboxyl radical.

In summary, our invention encompasses any mixture of polyvinyl alcohol with ether or ester derivatives of water-dispersible starches, wherein the ether or ester group contains the monovalent metal or ammonium salts of carboxyl radicals. Aqueous dispersions containing such starch derivatives and polyvinyl alcohol have proved to be remarkably stable and resistant to separation of polyvinyl alcohol from the mixture. In practice, the user (for example, the textile mill) may mix the starch derivative with the polyvinyl alcohol and water, or for purposes of convenience, the suitable starch derivative and the polyvinyl alcohol may be prepared and sold as a dry mix, whereby the user need only disperse such mix in water to obtain a dispersion of the improved characteristics already described. For certain other uses, as for example in the preparation of adhesives, it may be more convenient to have the finished dispersion containing the suitable starch derivative, polyvinyl alcohol, water and such other components as may be desired (i. e., solvents, plasticizers, preservatives, etc.), prepared, packaged and sold in its final form.

We claim:

1. A stable, aqueous, starch-polyvinyl alcohol composition comprising a mixture of water, polyvinyl alcohol and a substituted starch product selected from the class consisting of water dispersible starch ethers and starch esters, the said starch esters resulting from the reaction of starch with anhydrides of organic cyclic di-basic acids selected from the class consisting of maleic, succinic, phthalic, glutaric and citraconic anhydrides, said substituted starch product containing within its substituent groups a salt of a carboxyl radical selected from the class consisting of ammonium, sodium and potassium salts.

2. A stable aqueous starch-polyvinyl alcohol composition comprising a mixture of water, polyvinyl alcohol and a water dispersible starch ester, said starch ester resulting from the reaction of starch with anhydrides of organic cyclic di-basic acids selected from the class consisting of maleic, succinic, phthalic, glutaric and citraconic anhydrides and containing within the substituent ester group a salt of a carboxyl radical selected from the class consisting of ammonium, sodium and potassium salts.

3. A stable aqueous starch-polyvinyl alcohol composition comprising a mixture of water, polyvinyl alcohol and a water dispersible starch ether, said starch ether containing within the substituent ether group a salt of a carboxyl radical selected from the class consisting of ammonium, sodium and potassium salts.

References Cited in the file of this patent

UNITED STATES PATENTS

| | | |
|---|---|---|
| 2,133,125 | Vos et al. | Oct. 11, 1938 |
| 2,385,714 | LaPiana et al. | Sept. 25, 1945 |
| 2,461,139 | Caldwell | Feb. 8, 1949 |
| 2,487,448 | Kingerley | Nov. 8, 1949 |
| 2,500,144 | Beck | Mar. 14, 1950 |
| 2,524,008 | Deney | Sept. 26, 1950 |
| 2,613,206 | Caldwell | Oct. 7, 1952 |
| 2,622,997 | Lolkema et al. | Dec. 23, 1952 |
| 2,661,349 | Caldwell et al. | Dec. 1, 1953 |

OTHER REFERENCES

"Industrial Chemistry of Colloidal & Amorphous Materials," by Lewis et al., published 1943, pages 262 and 265.